United States Patent
Watanabe

(10) Patent No.: US 7,055,868 B2
(45) Date of Patent: Jun. 6, 2006

(54) CORRUGATED TUBE FITTING

(75) Inventor: Taro Watanabe, Mansfield, PA (US)

(73) Assignee: Highlands Corporation, Wilmington, DE (US)

( * ) Notice: Subject to any disclaimer, the term of this patent is extended or adjusted under 35 U.S.C. 154(b) by 0 days.

(21) Appl. No.: 10/887,625

(22) Filed: Jul. 9, 2004

(65) Prior Publication Data

US 2006/0006651 A1    Jan. 12, 2006

(51) Int. Cl.
*F16L 33/00* (2006.01)

(52) U.S. Cl. ........... 285/249; 285/382.7; 285/354; 285/903

(58) Field of Classification Search ......... 285/246, 285/247, 249, 903, 334.5, 322–324, 55, 382.7, 285/354

See application file for complete search history.

(56) References Cited

U.S. PATENT DOCUMENTS

| | | | |
|---|---|---|---|
| 62,722 A | 3/1867 | Zundorff | |
| 2,363,586 A | 4/1944 | Guarnaschelli | |
| 3,008,738 A | 3/1961 | Longfellow | |
| 3,291,895 A | 12/1966 | Van Dyke | |
| 4,437,691 A | 3/1984 | Laney | |
| 4,630,850 A | 12/1986 | Saka | |
| 4,674,775 A | 6/1987 | Tajima et al. | |
| 4,801,158 A | 1/1989 | Gomi | |
| 5,261,707 A | 11/1993 | Kotake et al. | |
| 5,441,312 A | 8/1995 | Fujiyoshi et al. | |
| 5,799,989 A | 9/1998 | Albino | |
| 5,845,946 A | 12/1998 | Thomas | |
| 6,019,399 A | 2/2000 | Sweeney | |
| 6,036,237 A | 3/2000 | Sweeney | |
| 6,099,046 A | 8/2000 | Oh | |
| 6,102,445 A | 8/2000 | Thomas | |
| 6,173,995 B1 | 1/2001 | Mau | |
| 6,276,728 B1 | 8/2001 | Treichel | |
| 6,371,154 B1 | 4/2002 | Kesterman | |
| 6,378,914 B1 | 4/2002 | Quaranta | |
| 6,428,052 B1 | 8/2002 | Albino et al. | |
| 6,435,567 B1 | 8/2002 | Kikumori et al. | |
| 6,877,781 B1 * | 4/2005 | Edler | 285/322 |
| 6,908,114 B1 * | 6/2005 | Moner | 285/324 |

FOREIGN PATENT DOCUMENTS

| | | |
|---|---|---|
| EP | 0 545 410 | 6/1993 |
| JP | 1-203791 | 8/1989 |

* cited by examiner

*Primary Examiner*—Aaron Dunwoody
(74) *Attorney, Agent, or Firm*—Duane Morris LLP

(57) ABSTRACT

A fitting for an end of a length of corrugated tubing forms a gas-tight metal-to-metal seal by rolling and folding an endmost corrugation into a axially extending annular groove in the fitting body. A ridged retainer grips the tubing corrugations above the endmost corrugation and is axially advanced into the fitting body by a nut. The cut end at the endmost corrugation of the tubing encounters the axially facing end of a tubular stub inside the fitting body and folds over itself and into the annular groove between the stub and the inside surface of the fitting body. A seal member is thus formed with a pair of substantially parallel sealing surfaces, and resides between the retainer and the outside surface of the tubular stub. The seal member forms a metal/metal seal with the tubular stub.

13 Claims, 7 Drawing Sheets

CORRUGATED TUBE FITTING

BACKGROUND OF THE INVENTION

1. Field of the Invention

The invention concerns a fitting for sealed termination of a length of corrugated tubing, especially corrugated stainless steel gas lines, of the type that includes a generally cylindrical fitting body and nut, threaded together on opposite sides of a tubing retainer. The retainer has one or more inward rings or ridges, complementary with the tubing corrugations. The retainer grips the corrugated tubing near a cut end. Tightening the nut on the fitting body forces the retainer to advance the cut end of the tube axially into the fitting body.

According to an inventive aspect, the cut end is carried by the retainer against an axially facing surface in the fitting body surrounded by an annular groove. The annular groove is sized to receive the end of the retainer, with a slight annular clearance approximating the thickness of the tubing material. The endmost corrugation ridge is folded over into the annular groove, flattened between the retainer and a cylindrical side wall of the annular groove, and advanced axially with the end of the retainer into the annular groove. The result is a mechanical connection and a gas-tight seal between the tubing and the fitting body, that does not rely on accuracy of axial position or clamping pressure.

2. Prior Art

Flexible corrugated tubing, especially corrugated stainless steel with optional plastic cladding, is advantageous for natural gas supply lines and other connections that need to be gas-tight and/or water-tight as well as durably protected. The flexibility of such corrugated tubing allows variations in orientation and spacing of the tubing between opposite ends. The tubing is durable and resistant to damage from punctures and crushing. The flexibility minimizes metal fatigue cracking due to repeated flexing. By engaging in the corrugations, terminating fittings can make strong mechanical connections with the tubing, to bear substantial tension without being pulled apart or allowing leakage.

It is desirable to provide strong and reliable couplings. The corrugated tubing must be sealed and mechanically attached to associated terminal fittings to provide a leak resistant flow path. A terminal fitting for a tubing end could be or could engage with any of various structures, such as a rigid supply pipe having a pipe thread fitting, part of an appliance, an intermediate device such as a tee or a diameter changing nipple, a valve, manifold, filter, nozzle or burner, etc.

The mechanical connection and the seal between the corrugated tubing and the terminal device or fitting should remain hermetically tight and mechanically load bearing over the life of the connection. Often that time equates with the life of the associated appliance. The tubing may be used to carry flammable gas to an appliance, and should survive adverse conditions without leakage. For example, the seal should remain gas-tight even in high temperature conditions as one might expect in a fire.

Various terminal fittings for corrugated tubing are known and are intended to provide good mechanical connections and hermetic seals. Known fittings have a range of structures and complexity. Some aspects that distinguish fitting structures over one another, in addition to mechanical attachment and sealing effectiveness, include the expense, the number and complexity of the parts, the steps required to assemble the fitting on a tube end, whether the parts are consumed or re-usable, etc.

Establishing a seal typically involves clamping the tubing with axial and/or radial pressure. The clamping pressure is achieved by tightening together threaded parts of the fitting, normally by applying torque between a nut and a fitting body. Such pressure may be achieved in various ways by which axial approach of the threaded nut and fitting body results in a clamping force applied usefully to the corrugated tubing material. Axial force may be applied to force a corrugation ridge into position, or perhaps to pinch a corrugation ridge between axially approaching structures, or both.

For holding the corrugated tubing against axial displacement, retaining structures such as circumferentially split retainer rings or other cinching structures may engage with the tubing. A split retainer ring can have one or more annular ridges extending radially inwardly into the valleys between adjacent corrugation ridges of the tubing. The retaining structure thereby is fixed against axial displacement along the corrugations.

Two or more parts are brought axially together on gripping structure and the tubing gripped therein, especially for pushing an end of the corrugated tubing axially against one of the two parts. In some arrangements, conical surfaces also are employed. For example, advancing a split ring retainer axially into a narrowing conical structure can cinch the split ring retainer inwardly onto the tubing.

Preferably, simple assembly of a few parts is all that is required to assemble and seal the fitting. The assembly advantageously should be limited to placing a nut and retainer on the tubing and threading the nut onto the fitting body. Tightening the threaded parts presses the cut end of the tubing against a gasket, or compresses, crimps or pinches one or more corrugation ridges at the cut end, and thus seals the walls of the corrugated tubing against the fitting parts.

In a seal in which parts are threaded together to clamp down onto the tubing, there is a minimum tightness needed to achieve a seal, and there is a limit as to how far the parts can be tightened. Different assemblers may apply more or less torque to the fitting. It would be advantageous if he integrity of the seal did not depend on obtaining a specific degree of torque. It would also be advantageous if the assembler could confidently determine when sufficient torque had been applied, rather than feeling compelled to torque the fitting as much as possible.

Some fittings use a resilient axially-compressible gasket. A compressible gasket might seal sufficiently with a tubing end over a range of distances, due to the compression of the gasket. Also, a lack of precision in cutting the end of the tubing (such as defects in the smoothness of the cut edge, alignment of the cut of the plane normal to the axis of the tube, and the like) do not defeat sealing if the dimensional irregularity is less than or equal to the compression of the gasket.

Compressible gaskets also have drawbacks. Compressible materials for gaskets are generally less durable than metal, particularly the stainless steel of a corrugated tube. Compression can permanently compress and otherwise damage compressible gasket material, making the fitting unsuitable for re-use after detachment. Compressible materials harden with time. Compressible materials may be damaged by heat, combustion or exposure to chemicals. Compressible materials may complicate assembly because it is necessary to achieve a certain compression force, but it may damage a gasket to over-tighten and crush the gasket. The correct amount of compression is difficult for the assembler to assess by feel.

Sealing by contact between two metal surfaces does not turn on the extent of compression and in a metal-to-metal seal it may be advantageous to torque the fitting as heavily as possible. Metal/metal seals require some precision in the surfaces but provide durable connections that do not degrade in time, are less likely than a gasket to be corroded by contact with a transported medium, and are mechanically strong. Tolerances associated with the precision of metal surfaces can be important because metals are not readily compressible.

It is possible to envision an axially cut end of a corrugated tube being sealed by engagement against an axially facing planar surface in a fitting body. The cut end of the tubing would need to be smooth and placed exactly on a plane perpendicular to the axis of the tube. Different sorts of tools are used to make tubing cuts, which affect the nature of the cut (e.g., a hacksaw versus a pipe cutter). The cut edge may have burrs or irregularities. Some cutting techniques (e.g., a chop saw) can produce a cut edge at any phase position along the period of the corrugations, between the maximum and minimum diameter. These variations complicate the possibility of a direct endwise seal between the cut end and an abutting surface arranged substantially in a plane normal to the axis of the tube.

To reduce the possibility that unevenness at the cut end could result in a gap, some fittings clamp and flatten one or more corrugations of the tubing between vise-like abutting surfaces. The surfaces may be planar or conical but typically extend radially so as to be brought axially together toward abutment when tightening the fitting. These radial abutting surfaces flatten the endmost corrugation(s) into a flattened radial flange with flat annular sealing surfaces on opposite sides, in a plane normal to the longitudinal axis of the tubing. An example is disclosed by U.S. Pat. No. 4,630,850—Saka, wherein tubing corrugations are clamped between axially facing surfaces of a split ring retainer and an annular surface in a fitting body. Similar results are achieved if the clamping surfaces are conical, whether the conical surface is constricting or flaring with axial advance, as disclosed respectively in U.S. Pat. Nos. 6,173,995—Mau or 5,799,989—Albino. Although conical, these clamping surfaces operate in a manner similar to Saka, coming solidly together on one or more corrugations and being tightened as far as the assembler can manage.

It would be advantageous to maximize the benefits of metal to metal sealing strength by providing a coupling that forms a metal-to-metal seal that is not sensitive to the quality of the cut at the end of the tubing and which further does not rely upon the application of excessive force to flatten an end corrugation sufficiently to form a flat seal between annular sealing surfaces normal to the longitudinal axis of the tubing. At the same time, it would be advantageous to provide a fitting that achieves a sealing state that the assembler can sense as the fitting is tightened. Although not relying on extreme torque to seal, the fitting should also achieve a tightness whereby the fitting is difficult or impossible to unthread manually without the use of tools.

SUMMARY OF THE INVENTION

It is an object of the invention to provide a fitting for use in various forms of corrugated tubing terminations and couplings, having good mechanical strength and sealing performance compared to known fittings, with minimal complexity and expense. It is another object to provide a metal-to-metal seal that is formed simply by threading together a fitting on a cut end of tubing without needing extreme torque to form a seal that depends on the pressure exerted between clamping surfaces. Instead it is an object to obtain metal/metal sealing upon achieving a particular state of assembly that can be felt by the assembler.

In one embodiment, the invention provides a fitting for an end of a length of tubing having corrugations ranging between maximum and minimum diameters (peaks and valleys) and terminating axially at an end section. Preferably the tubing is cut off at or near a minimum diameter or valley along the periodic corrugations; however according to an inventive aspect, the cut need not be highly precise because the seal is formed behind the cut end when axially advancing surfaces cooperate to roll the endmost corrugation into a bead that is captured in an annular clearance space between the retainer and a cylindrical surface along which a sliding seal is developed.

The fitting includes a fitting body, a nut that slides along the tubing and threads onto the fitting body, and a retainer that is advanced axially by the nut when threaded onto the fitting body. The retainer has at least one ridge complementary to the outer shape of the corrugations. The retainer is sized and shaped to grip the tubing axially, extending into the corrugations to a radius between the minimum and maximum radii of the corrugations.

The fitting body has an annular groove at the bottom of a cavity in a threaded end of the fitting body. The axial end of the retainer fits into the annular groove, with clearance between the cylindrical inner side of the annular groove and the cylindrical inner surface of the retainer. The clearance is just enough to admit a flattened corrugation of the material of the tubing, preferably slightly less than the thickness of two layers of the tubing material so as to compress the tubing material into this clearance space.

The axial end of the retainer that faces toward the fitting body is placed one corrugation away from the cut end of the tubing, near a minimum corrugation diameter. The fitting end nut has a thread complementary with the threaded surface of the body, a cap part or the nut extending radially inwardly to engage axially behind the retainer for urging the retainer axially toward the fitting body as the nut is tightened on the body by threading.

The fitting body also has a cylindrical inside throughopening inside of said annular groove. The annular groove can be defined between an inside surface of the fitting body and an outside surface of a tubular stub spaced radially inwardly by the annular groove and extending axially toward the corrugated tube for a short distance inside the fitting body. The tubular stub can be integral with the fitting body or can be an inserted length of cylindrical tube, fit into a central bore in the fitting body.

The tubular stub has an axially facing flat face that defines an annular flange aligned at least partly with the minimum diameter of the corrugations of the tube. As the fitting is tightened, the retainer is axially advanced by the nut, toward the fitting body and eventually into the annular groove between the tubular stub and the inside surface of the fitting body. However, the annular flange at the end of the tubular stub intercepts the cut end of the corrugated tube. The endmost corrugation is rolled over into a bead that is carried axially in front of the retainer, down into the annular groove. The endmost corrugation becomes flattened behind the bead. Two thickness of tubing are flattened and caught in the clearance between the retainer and the tubular stub.

In one embodiment, the retainer has a precisely cylindrical surface. In another embodiment, the retainer can be cut back to provide a sharp edge that engages the tubing, e.g., with an angle of 75 to 90 degrees. In still another embodiment, the bottom of the annular groove carries a compressible gasket that is compressed in an axial direction by the bead. In yet another embodiment, the nut bottoms out on an outer flange of the fitting body, at which point the fitting is tight, and optionally setting the extent to which it is possible to axially advance the bead against the gasket.

The invention encompasses the foregoing structure and also provides for a method for forming a coupling for carrying a compressed gas or other fluid. The method includes providing corrugated tubing having corrugations ranging between a maximum diameter and a minimum diameter and including an endmost section and a cut end. The method further provides engaging the tubing in a retainer having a ridge disposed axially behind at least an endmost corrugation of the tubing, and urging the endmost section axially against an edge peripherally surrounded by an annular groove. The edge has a diameter greater than the minimum diameter, such that the urging of the endmost section folds the endmost section over itself to provide a bead. Further, the invention involves capturing the tubing in a clearance space behind the bead and between sealing cylindrical surfaces extending axially in the annular groove. Additional aspects will become apparent in connection with the following discussion of examples.

BRIEF DESCRIPTION OF THE DRAWINGS

There are shown in the drawings examples of certain embodiments of the invention. It should be understood that the invention is not limited to the examples shown in the drawings but is capable of other embodiments in accordance with the scope of the invention claimed. Like reference numerals denote like features throughout the specification and drawings. In the drawings.

DETAILED DESCRIPTION

Figure 1:
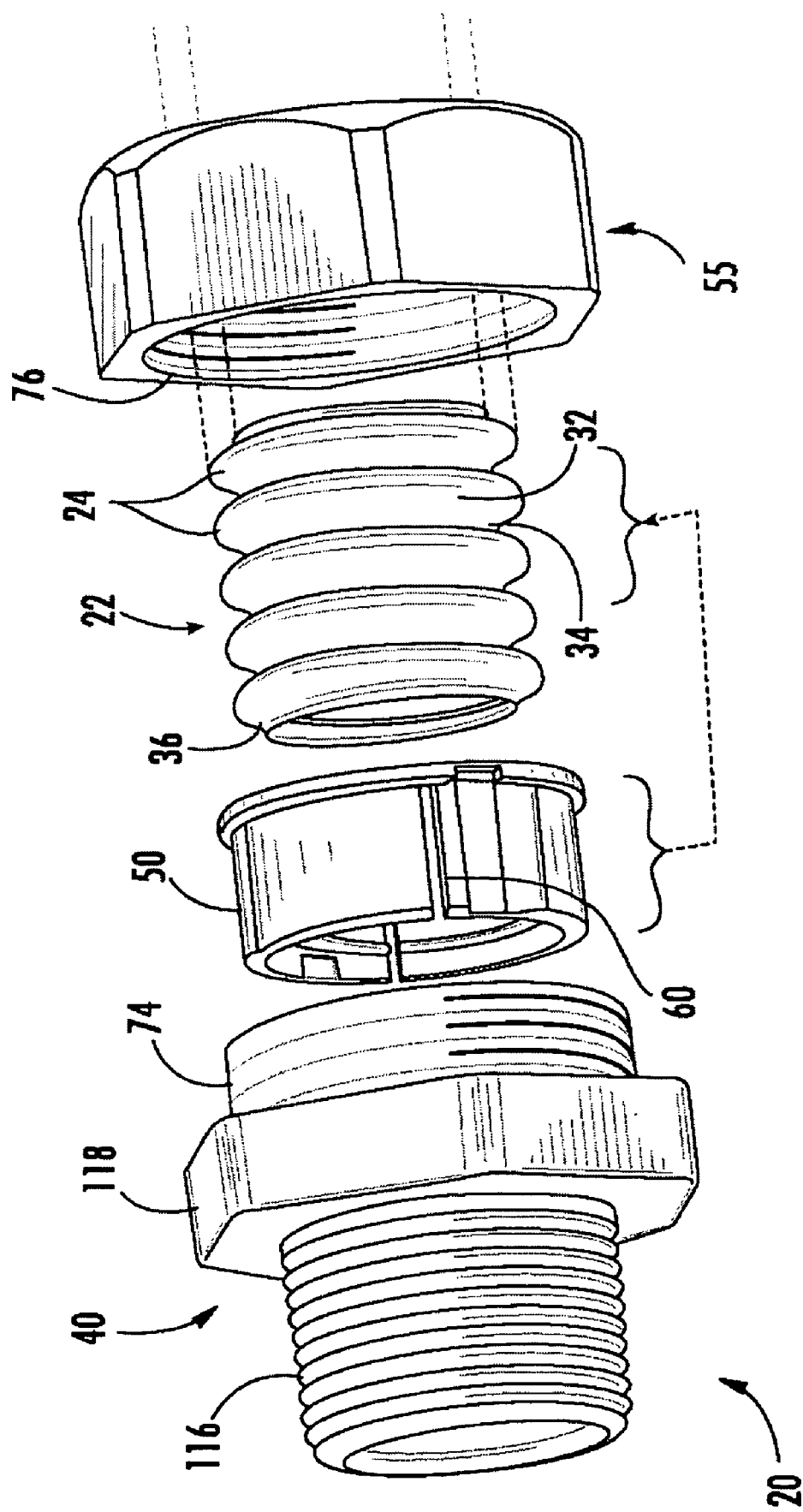
FIG. 1 is an exploded perspective view showing the parts of the inventive fitting, according to one embodiment.

An inventive fitting 20 for an end of a length of tubing 22 such as corrugated stainless steel tubing is shown in FIGS. 1–7, which include exemplary variations as discussed herein. FIG. 1 shows the respective parts in an exploded view as a cut end of a length of tubing of indefinite length, to be terminated by fitting 20. The termination can be for any of the various purposes that might benefit from a sealed connection to the tubing, especially mechanical attachment and hermetic sealing.

In the non-limiting example shown in FIG. 1, the fitting forms a union between the tubing and a pipe thread on a generally cylindrical fitting body 40. This sort of union is typically used for making a connection between the flexible corrugated tubing and a fixed pipe, manifold, apparatus housing or other station disposed along a flow path for gas or fluid in communication with tubing 22. The fitting body 40 has a tapered thread facing away from tubing 22 and wrench flats. The invention is fully applicable to all such sealed connections with such fitting bodies and other particular elements, whether they involve couplings between lengths of tubing of the same or different type or structure or cross section, hookups with valves and regulators, reservoir and vessels, joints such as tees and elbows, manifolds, bulkheads, etc.

Tubing 22 has corrugations 24, namely spatially periodic regular variations in diameter forming successive ridges and valleys around the axis of the tube, ranging between maximum diameter 32 and minimum diameter 34. The corrugations proceed along the longitudinal (axial) extension of tubing 22 at least for a distance from the cut end 36. Tubing 22 may be advantageously cut from a longer length using a hand tool such as a hardened wheel tubing cutter or a hacksaw (not shown), for example. A power tool such as a radial arm or pivoting chop saw can be used.

The tubing end is advantageously cut off square, i.e., on a plane normal to the longitudinal axis of tubing 22. Preferably the cut is made at an axial position at or near a minimum diameter 34 between corrugation ridges 24. The cut may be made at other locations in other exemplary embodiments, but the minimum diameter location for the cut has advantages that will shortly become apparent. Fitting 20 forms a metal-to-metal seal by deforming and clasping an end section of the tubing consisting essentially of the endmost corrugation 106 at the cut end 36 (compare FIGS. 1 and 2).

Figure 3:
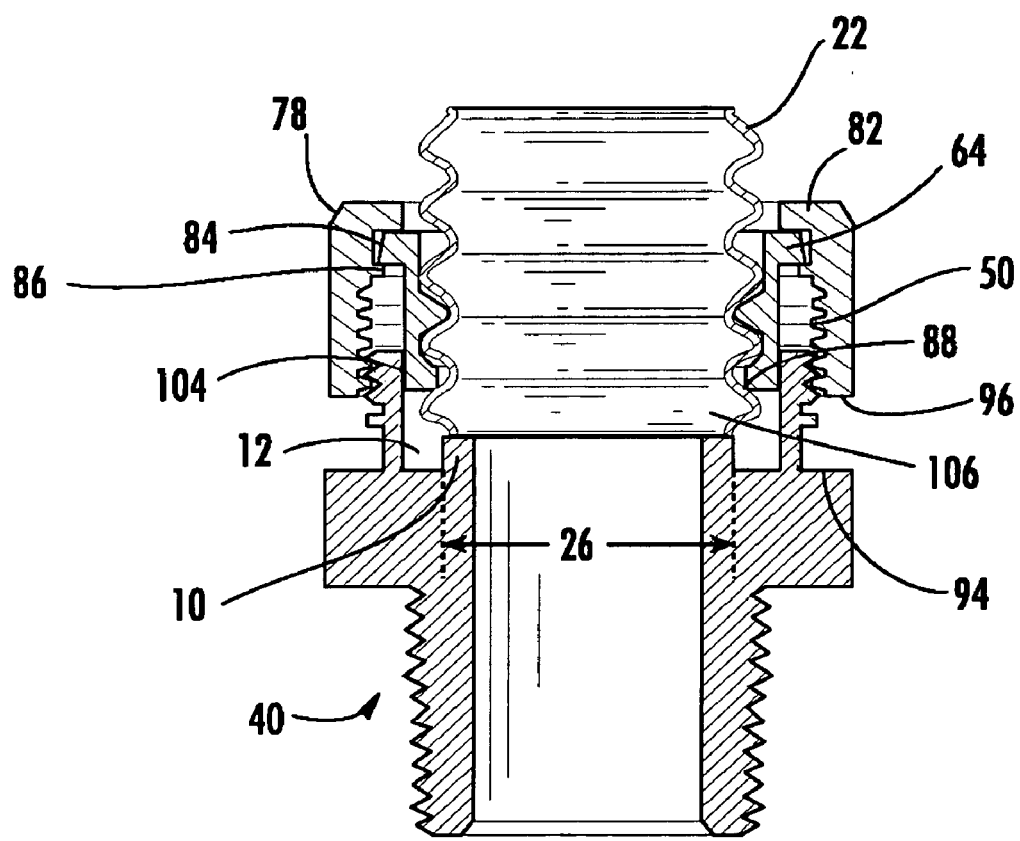
FIG. 3 is a section view illustrating an early stage in the assembly of the fitting.

Referring to FIG. 1 from left to right, fitting 20 comprises fitting body 40, a split retainer 50 with internal ridges that engage the corrugations of tubing 22, and a nut 55 with a central opening. The nut 55 is initially placed along tubing 22 and when threaded onto fitting body 40 urges retainer 50 and tubing 22 toward the fitting body 40. Retainer 50 as shown in FIG. 3 is placed initially at one corrugation ridge from the cut end of tubing 22.

The tubing 22 shown in the drawings is bare corrugated tubing, but could be a plastic clad or wrapped or coated tubing from which the covering material is stripped near the cut end 36. Fitting body 40 includes a cylindrical threaded surface 74 to receive thread 76 of nut 55, and on the opposite end a tapered thread 116 can engage with a female pipe thread. Fitting body 40 also includes wrench receiving faces 118 similar to those on nut 55, for assisting in tightening the fitting. This type of union is simply an example, and the invention is fully applicable to other sorts of fittings, as well as other gender relationships and the like.

Retainer 50 has an inwardly ridged part that has a minimum diameter formed by one or more rounded ridges 62 that extend radially inwardly and preferably complement the shape of one or more of the corrugations. The ridge(s) 62 also can fit more or less precisely with the tubing (see the exploded view in FIG. 2). Ridge 62 extends radially inwardly to a sufficiently small diameter, namely a diameter less than the maximum and greater than the minimum outside diameters 32, 34 of tubing 22, so that retainer 50 functions to grip the tubing at least axially. The retainer 50 is placed so that its axial end facing toward the fitting body is located axially behind an endmost corrugation of the tubing relative to the cut end, as shown in FIG. 1 by a broken line arrow, or as shown assembled in FIG. 3. The end of the retainer facing the fitting body can have a cylindrical inside surface (as opposed to a rounded ridge) and is arranged by action of tightening the fitting to fold over the endmost corrugation and to carry it forward into an annular groove in the fitting body while holding the folded over corrugation tightly against a cylindrical surface of the fitting body.

Retainer 50 has an end 64 opposite from the end facing the fitting body, that is engaged by the nut 55, for example end 64 defining an outward flange. Retainer 50 can be a circumferentially split element or can comprise two or more structures that in the assembled condition of the fitting include ridges facing inwardly to reside between the maximum diameter parts of successive corrugations. An axial face of retainer 50 is directed toward the fitting body. Retainer 50 can include one or more of a split ring or washer, plural circumferential arc sections, resiliently mounted or relatively movable finger-like structures or the like.

In the illustrated embodiment, retainer 50 is split by an axially elongated slot 60 whereby retainer 50 can be resiliently or malleably expanded as necessary to enable at least one ridge 62 to be passed longitudinally over a maximum diameter ridge 32, back from cut end 36. One or several slots 60 can be provided and can extend part of the axial length of the retainer from an integral ring large enough to pass over the corrugations. The slot(s) can extend axially through the length of the retainer, separating the retainer into integral segments.

Figure 2:
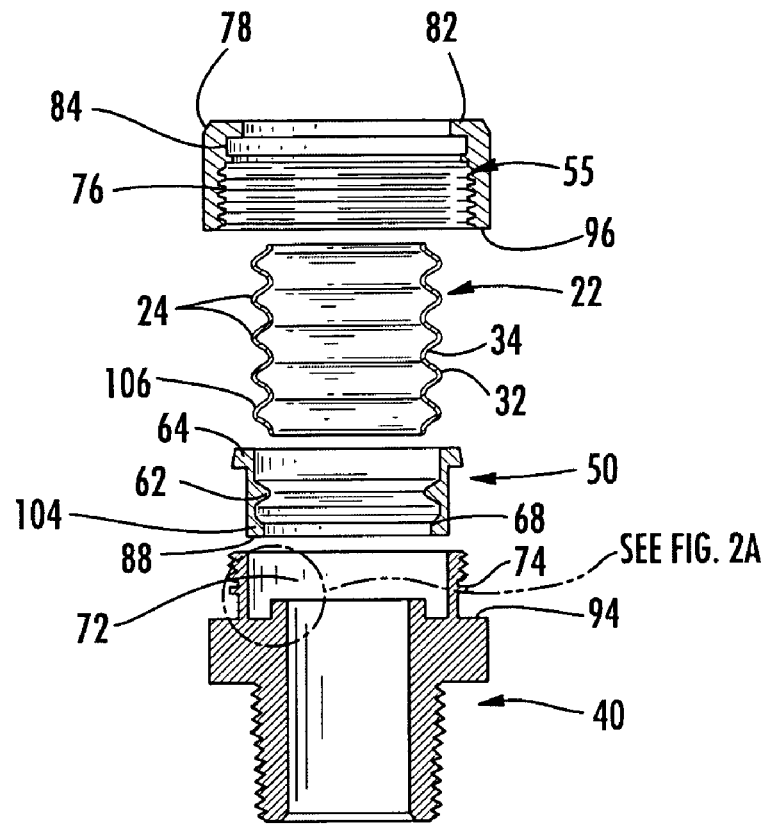
FIG. 2 is an exploded elevation view corresponding to FIG. 1, partly in section.

Retainer 50 has a terminal end 104 at its axial end facing the fitting body, forming the bottom end of retainer 50 in the orientation shown in FIGS. 2 and 3. Terminal end 104 defines a radially inwardly facing cylindrical surface 68, an inward corner or edge 88, and a face or axial end that in this embodiment is oriented in a plane normal to the longitudinal axis.

Nut 55 of fitting 20 is placed on tubing 22 before retainer 50 (or nut 55 can be brought up toward cut end 36 from the opposite end of the tubing). Nut 55 is to be threaded onto fitting body 40 so as to capture retainer 50 and tubing 22 therein.

Fitting body 40 has a hollow cylindrical length 72 with an inside diameter sized to admit retainer 50 with tubing 22 therein. An outside threaded surface 74 of fitting body 40 receives threaded nut 55. Nut 55 is fit by engaging threaded surfaces 74 and 76, whereupon relative rotation of nut 55 advances nut 55 axially, together with retainer 50 and tubing 22 therein, in the direction of fitting body 40. The cap part 78 of nut 55 extends inwardly to a diameter less than the outside dimension of retainer 50. In the example, flange 82 extends radially inwardly above a position 84 at which flange 64 resides. The flange can be disposed above a lip 86 that forms an annular inwardly-extending ridge on nut 55 that may eventually be useful to draw retainer 50 away from fitting body 40 when unthreading the nut 55 during disassembly.

According to an aspect of invention, fitting body 40 has an axially facing structure that cooperates with retainer 50 during and after assembly to form sealing metal-to-metal connections with the corrugated tubing 22. Briefly, cooperative surfaces of retainer 50 and fitting body 40, position the cut end 36 of an end most corrugation of tube 22 so as to encounter the flange end 10 of a tubular stub during axial advance of the tube 22. The stub and the end 10 thereof are spaced radially inwardly from adjacent inside walls of the fitting body 40, so as to define an annular groove with an axial extension. With axial advance of tube 22, the retainer 50 pushes the cut end 36 of tube 22 against and the flange end 10 and folds the endmost corrugation of tubing 22 radially outwardly and over itself, thus temporarily forming a bead. The bead is flattened by further advance of retainer 50 and compressed between retainer 50 and the cylindrical outer surface of the tubular stub. In the exemplary embodiments discussed, the end section of tube 22 that is shaped and compressed is the endmost corrugation 106, specifically over the axial span between two successive minimum diameters or valleys of the corrugations. It is also possible to involve a different or specifically larger axial spans along the corrugations in forming the seal.

Figure 6:
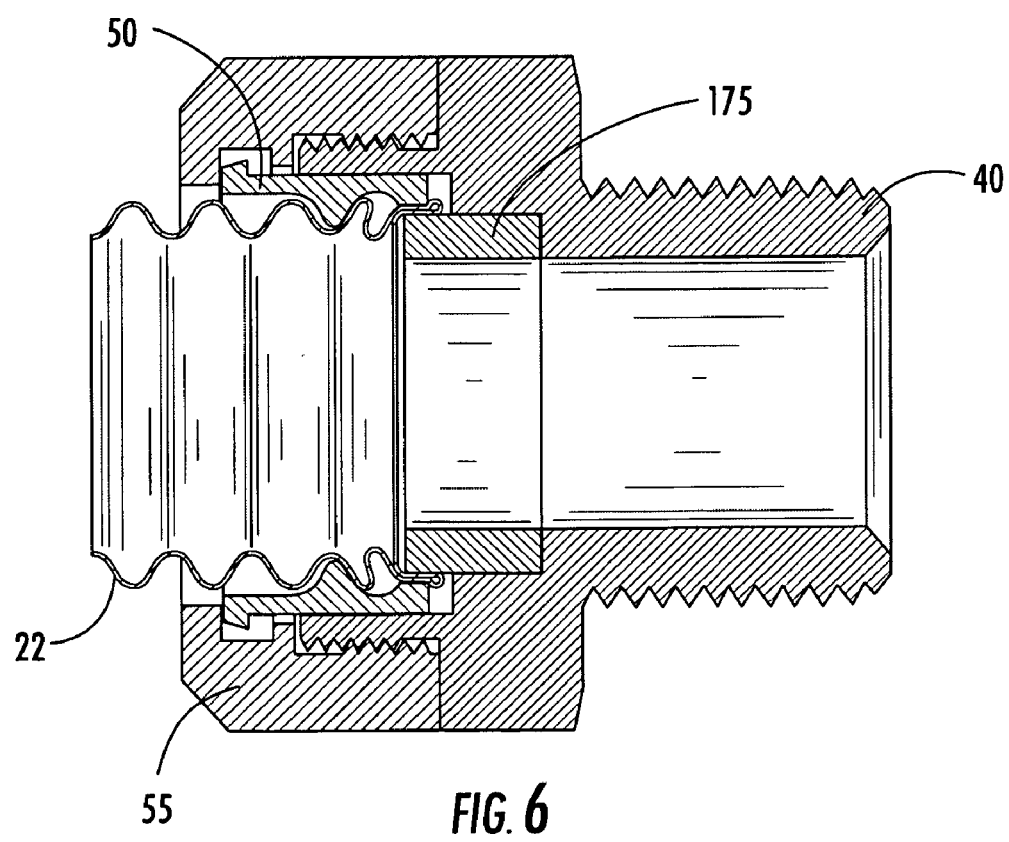
FIG. 6 is a section view showing the embodiment of FIG. 5 in a sealed state after tightening.
Figure 7:
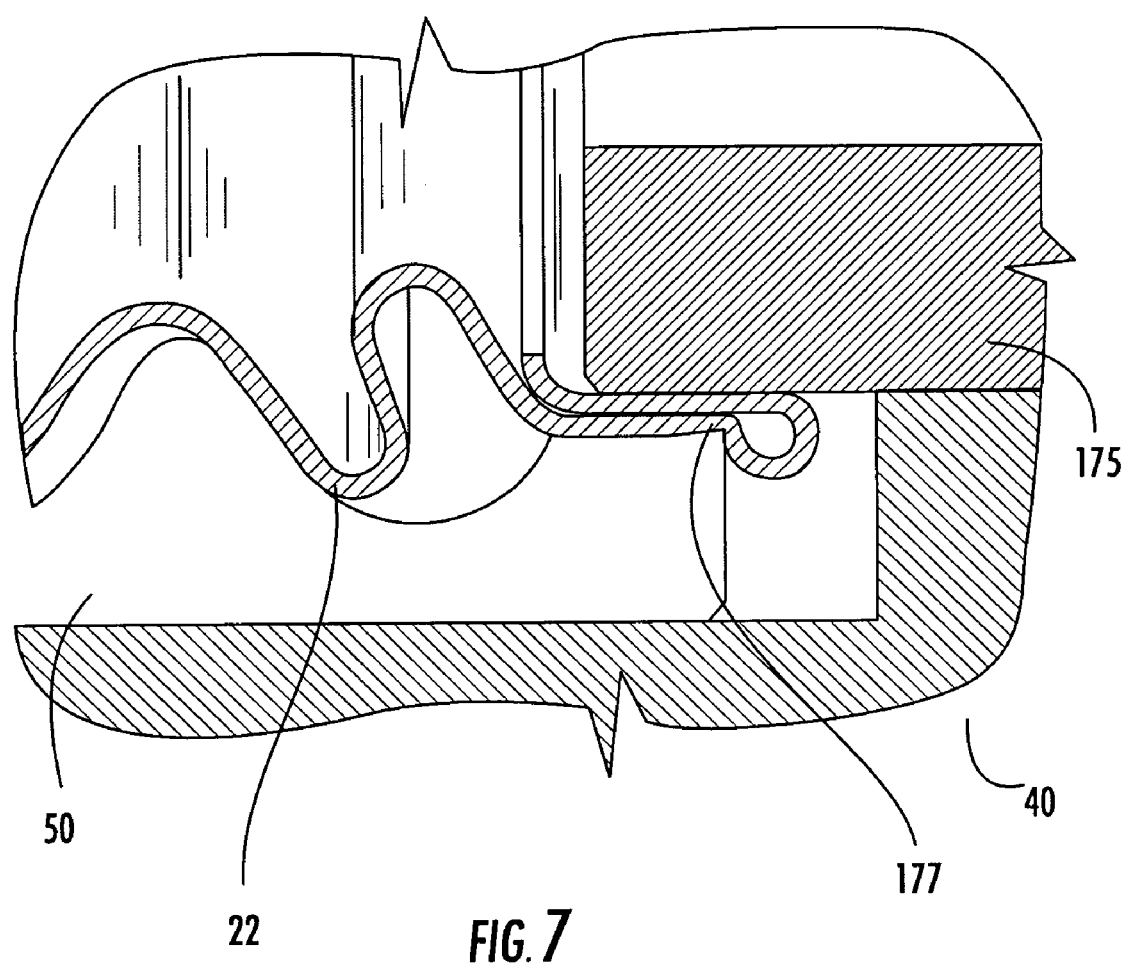
FIG. 7 is a detail view of a further alternative including a gasket at the bottom of the annular groove in the body.

The terminal end 104 of retainer 50 has an inside diameter that is just slightly larger than the outside diameter of the tubular stub, namely larger by the thickness of the folded corrugated tubing (no more than two thicknesses of tubing material). The outside diameter of terminal end 104 engages against the cylindrical inside surface of the fitting body 40. As the fitting is tightened, the terminal end 104 brings the endmost tubing corrugation against the tubular stub, folds and flattens the endmost corrugation so as to flatten the endmost corrugation between the terminal end 104 and the tubular stub, and carries the tubing forward toward the bottom of the annular groove 12 between the tubular stub and the inside wall of the fitting body. The endmost corrugation can form a bead in front of the terminal end 104, shown for example in FIGS. 6 and 7. The bead can compress a gasket in the bottom of the annular groove as shown in FIG. 7.

The cooperative action of fitting body 40 and nut 55 provides a tactile indication of when the metal-to-metal sealing surface is formed. Increasing resistance is encountered until as the endmost corrugation is rolled over and flattened. The resistance subsides to a substantially constant resistance as the flattened bead is captured in place and slides toward the bottom of the annular groove. It is not necessary to apply a great deal of torque to obtain the seal or to continue to tighten until very substantial resistance is felt. As shown in FIG. 6, however, it is possible to arrange for the nut 55 to bottom out against the fitting body at a position in which the terminal end 104 of the retainer 50 is spaced from the bottom of the annular groove between the tubular stub and the inside of the fitting wall.

The engagement of the retainer 50 in fitting body 40, with the endmost corrugation between them, applies forces that position, form and engage sealingly with endmost corrugation 106. A clamping force is delivered between retainer 50 (as urged by nut 55) and fitting body 40, more particularly end flange 10 shown in cross-sectional detail in FIG. 2A (which is an enlargement of the portion of FIG. 2 identified with a circular solid line).

Figure 2A:
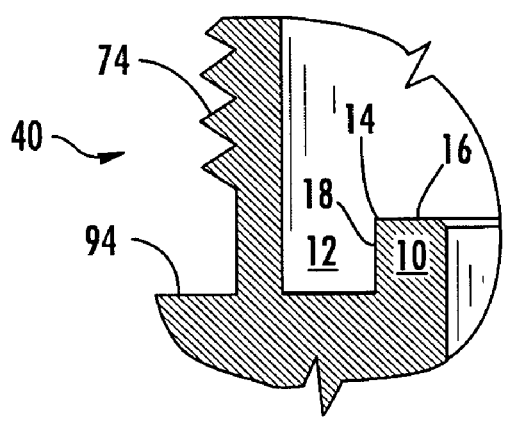
FIG. 2A is a detailed section view of the area so identified in FIG. 2.
Figure 4:
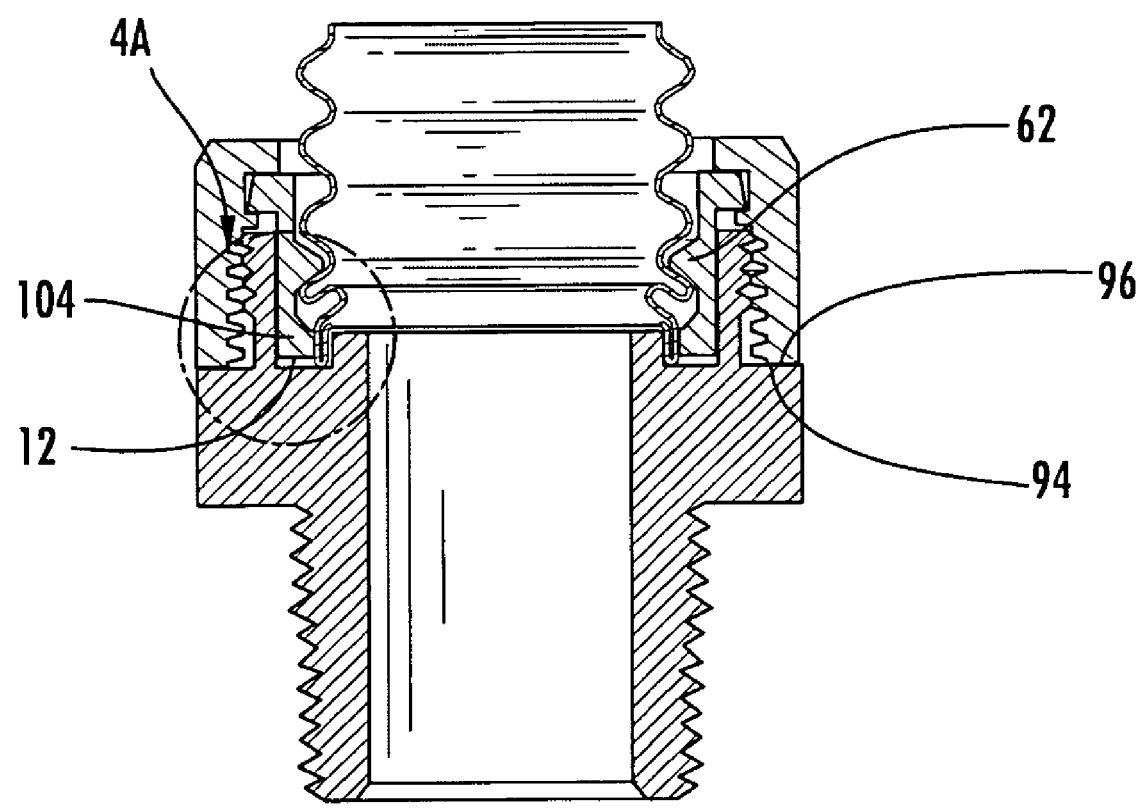
FIG. 4 is a section view illustrating a stage in assembly in which the fitting has been tightened to form a seal.
Figure 4A:
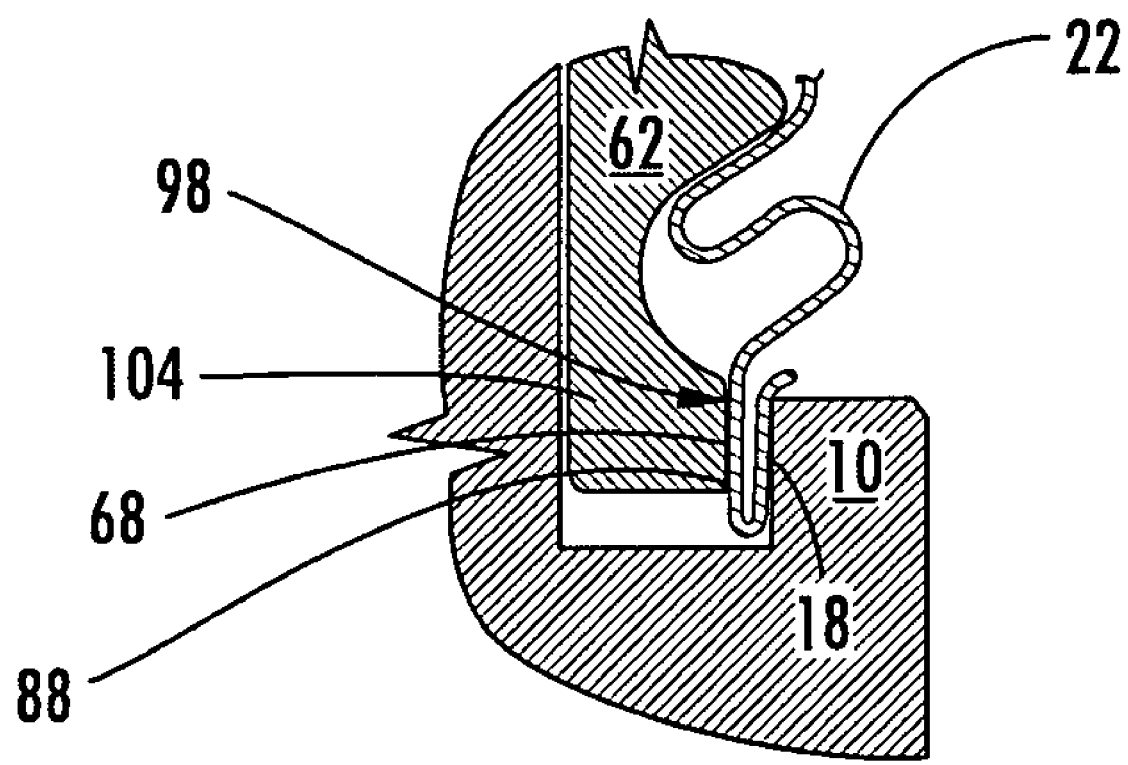
FIG. 4A is a detailed section view of the area so area identified in FIG. 4.

Referring to the detail of FIG. 2A, annular flange or tubular stub 10 in fitting body 40 has an outer edge 14 at the intersection of a cylindrical outer surface 18 and axially facing wall 16. The annular groove 12 is formed between the outer surface 18 of the tubular stub 10 and an inside of the outerwall of fitting body 40. The radial span of groove 12 is sufficient to admit the bottom flange 104 of retainer 50, and has clearance so that the endmost corrugation can be flattened between retainer 50 and tubular stub 10. As shown in FIGS. 4 and 4A, the bottom or terminal flange 104 of retainer 50 becomes nested in annular groove 12 and captures an end section of tubing 22, preferably one endmost corrugation, folding over and flattening the end section against the resilience and malleability of the material of tube 22, to form a sealing engagement.

FIG. 3 is a cross section view showing a preliminary stage in which the parts are assembled but not yet tightened into sealing engagement. Nut 55 is shown in place over retainer 50, for advancing toward fitting body 40 by forward threading along the threads on the outside of the fitting body. The axially leading edge 96 of nut 55 is spaced from the radially extending surfaces 94 that define the wrench flats for holding or manipulating fitting body 40, providing room to tighten nut 55 down.

In FIG. 3, the cut extreme end of tube 22 rests against the axially facing end face of the tubular stub 10 that is spaced radially inwardly from the outer wall of the fitting body to define annular groove 12. As cut off at or near the minimum diameter of a corrugation, the end of tube 20 is spaced slightly from the outer corner of stub 10. The tube 22 is centered by its engagement in retainer 50, which in turn is slidingly engaged against the inner surface of the fitting body wall.

The progression of occurrences upon further tightening, i.e., further advance of nut 55, retainer 50 and tubing 22 toward and into fitting body 40, is apparent by comparing FIG. 3, against FIG. 4 in which nut leading edge 96 is stopped or bottomed out against the axial facing surface 94 of the wrench flats of fitting body 40. Such a stopping action is helpful when the fitting is tight, but the tightness of the nut on the fitting body is not a determining factor for achieving the metal-to-metal seal.

The sealing structures and surfaces are shown in detail in FIG. 4A, which is an enlargement of a portion of FIG. 4 identified with a circular solid line. In one embodiment, retainer 50 comprises a non-deformable brass retainer, although other suitably strong and durable metal materials may be used. Nut 55 and fitting body 40 can also comprise brass or another similar material. Furthermore, in other embodiments, nut 55 and/or fitting body 40 may have features other than the wrench flats for facilitating grasping and rotation (e.g., knurling).

As nut 55, retainer 50 and tubing 22 advance upon fitting body 40, cut end 36 comes into axial contact with the axially facing wall 16 of tubular stub 10. Further force exerted by retainer 50, as retainer ridge 62 advances tubing 22 in the direction of fitting body 40, deforms the end section of tubing 22 (preferably one endmost corrugation 106), and causes the end section to fold over upon itself and outwardly in the area of annular groove 12, where the end section is caught between retainer 50 and stub 10, and is deformed into the shape show as sealing member 98. In particular, cut end 36 catches on axially facing wall 16 because the tubular stub 10 has an outer diameter 26 that is greater than minimum corrugation diameter 34 and greater than the actual diameter at cut end 36. The outer diameter 26 is chosen to be between the inner and outer diameter extremes 32, 34 of the corrugations. Diameter 26 can be varied so as to be somewhat nearer to one of the inner and outer diameter than then other, which affects the overlap of cut end 36 over axially facing wall 16. In one embodiment, the cut end is at the minimum tubing diameter and abuts stub 10 near its outer edges as apparent from FIG. 4A. Thus the sealing member 98 comprises most or all of one corrugated bend, and is pinched into a U-shape with tightening, as shown.

Retainer 50 transfers the tightening force applied to nut 55 on its helical threads, into axial directed force applied to force endmost corrugation 106 against the sealing structures in fitting body 40. This downward force is ultimately concentrated between edge 14 and terminal end flange 104. As nut 55, retainer 50 and tubing 22 advance upon fitting body 40 causing cut end 36 to catch on radial axially facing wall 16 of annular flange 10, the force exerted by the leading edge of terminal flange 104, in particular inward edge 88, contacts endmost corrugation 106 and mechanically deforms it. Stated alternatively, endmost corrugation 106 becomes malleably and somewhat resiliently crimped by and between advancing inward edge 88 and edge 14, to form a seal member 98 that is compressed between the terminal end 104 of retainer 50 and the outer surface 18 of the tubular stub 10, when the terminal end 104 is pushed into annular groove 12. Because of the design of the inventive fitting, a high torque is not needed to provide the described metal to metal seal of the invention. Rather, nut 55 is simply turned until nut 55, more particularly nut leading edge 96, contacts outer annular radial surface 94 of fitting body 40.

Seal member 98 in FIG. 4A has inner and outer substantially parallel walls along an axial distance between stub 10 and the opposed surface 68 of retainer 50. The end flange 104 of retainer 50 is nested in annular groove 12 together with the formed sealing member 98. The substantially parallel webs of seal member 98 are nested between the axially oriented inwardly facing surface 68 of terminal flange 104, and wall surface 18 of tubular stub part 10. In the exemplary embodiment, the parallel walls of seal member 98 are substantially coextensive with and lay parallel to their opposed surfaces 68, 18. Cut end 36 of tube 22 in the assembled state rests near its starting location on axially facing wall 16 of tubular stub 10, but has been turned over during bending deformation of the end section (e.g., the endmost corrugation).

The collapsed end section of corrugated tubing 22 forms a seal with the fitting body. This seal renders the fitting useful for transporting natural gas and other gases or fluids. An aspect of the invention is that assembly does not damage the operative sealing surface (namely surface 18), because the cut end 36 abuts the end wall 16 of tubular stub 10 instead of the sealing surface. Another aspect is that the smoothness and alignment of cut end 36 has little effect on the seal. Any burr that may be present on the cut end, for example, does not contact or interaction with wall 18 or surface 68 of terminal flange 104.

Figure 5:
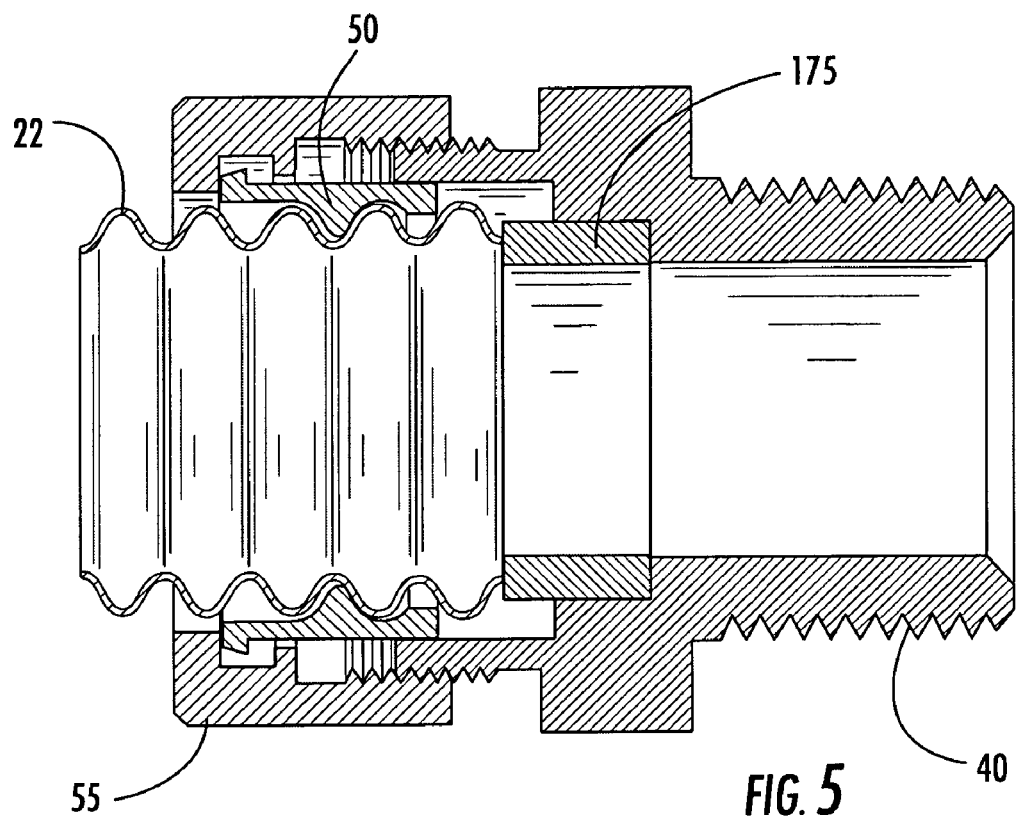
FIG. 5 is a section view showing an alternative embodiment with a sharp edged retainer at a stage of commencing tightening and wherein the tubular stub is formed by an integrally separable tube.

The embodiments shown in FIGS. 5–7 illustrate some variations within the scope of the invention. In these embodiments, the tubular stub in the fitting body is provided by an a short integral piece of tubing 175 that is fit into a bore in fitting body 40. The annular slot is formed between the outside of that tubing 175 and the inside of the fitting body wall. The inserted tubing can be surfaced with or made of a material that is apt for sealing against the material of the corrugated tubing.

As also shown in FIGS. 5–7, the inside leading edge or corner of the terminal end 104 of the retainer 50 can be cut with a converging conical female taper so that the extreme leading edge of the terminal end is sharpened to bite into the tubing as the fitting is tightened. This facilitates formation of a rounded or toroidal bead in the folded endmost corrugation, as best seen in FIGS. 6 and 7. The conical taper can be shaped so that the cross sectional angle 177 between the axial end of terminal flange 104 and the radially inner surface of the retainer is 75 to 90 degrees, for example. This effect of a sharpened edge can also be achieved by providing a male conical taper at the axial end of retainer 50 instead of the right angle face shown in FIGS. 6 and 7.

The embodiment of FIGS. 5–7 operates similarly to the embodiment of the earlier figures except that there is little relative sliding between retainer 50 and tubing 22, resulting in the more rounded bead of FIG. 7 (compare FIG. 4A). This bead is apt for forming a compression seal with a compressible gasket in the bottom of the annular groove, as seen in FIG. 7. By arranging the dimensions appropriately, nut 55 bottoms out on fitting body 40 to fix the extent of axial advance of the bead against the gasket. The fitting cannot be over-tightened, and there is no particular benefit in applying further torque after the nut bottoms out on the body.

The invention has been described with respect to the fitting as an apparatus or as an apparatus in combination with corrugated tubing that is of the appropriate dimensions to form a gas-tight metal-to-metal seal as shown in the foregoing progression of views. The invention can also be considered a method for forming a gas-tight metal-to-metal seal.

The method includes providing tubing that is cut at the end, preferably at a longitudinal point spaced from a maximum diameter peak, i.e., between successive maximum diameter peaks of adjacent corrugations. The cut most preferably is placed at or near the bottom of a radially narrow point or valley between adjacent corrugations, which generally is the easiest place to cut the tubing.

The tubing may advantageously be cut using a hand tool such as a hardened-wheel tubing cutter that is rotated and tightened until the wheel breaches the tubing wall, or with a hacksaw that is reciprocated to cut from one side. A power tool such as a radial arm or pivoting chop saw also can be used.

The method includes urging the endmost section of tubing to fold over itself by initially engaging the tubing with a retainer, preferably having a ridge placed axially behind at least an endmost corrugation of the tubing. The retainer is advanced axially relative to a fitting body to force the end section of the tubing forward, which end section may comprise only the endmost corrugation or one or more bends associated with peaks and valleys or plural peaks, etc. The cut end of the tubing is forced axially against an annular flange, such as the axially facing end of a tubular stub, having an outer edge peripherally surrounded by an annular groove that spaces the outer edge from the cylindrical inside surface of the fitting body holding the tubing. The outer edge of the tubular stub has a diameter between the maximum and minimum diameters of the corrugations. The leading edge of the retainer has an inside diameter less than the maximum diameter of the corrugations but greater than the outer edge of the annular flange, leaving a radial clearance.

The cut end of the tubing therefore catches on the annular flange and is stopped axially as the retainer advances the tubing axially. The leading edge of the advancing retainer presses the peak bend of the endmost corrugation further, beyond the axial face of the annular flange. This deforms, compresses and rolls the endmost corrugation, causing the endmost corrugation to fold over the edge of the annular flange and to double the tubing material over itself. The bead thus formed becomes flattened into a double-walled U-bend in cross section, compressed between the inside diameter of the retainer and the outside diameter of the tubular stub.

The U-bend formed in the tubing is folded or doubled over from the cut end, which has a phase position in the corrugations at a valley or diameter minimum (at least at a space from the peak or maximum), to a point axially beyond and above the adjacent peak or maximum nearest to the cut end, which peak becomes the bottom of the U-shape at the axial terminus of the tubing when the assembly is completed. The inside and outside webs of the U-bend define a pair of substantially parallel inside and outside sealing surfaces compressed into the annular groove.

The invention also comprises application of the structures discussed above to achieve the functions noted, including using a sharp retainer edge to bite into the endmost corrugations, using the resulting bead to compress a gasket, and likewise proceeding as discussed.

The method further provides that the annular groove is in a fitting body having an annular outward surface. The retainer is engaged in a nut having a leading surface that catches axially behind the retainer. The nut is advanced, preferably by threading on corresponding threads on the outer surface of the fitting body, advancing the nut until the leading surface contacts the annular outer surface of the fitting body.

The inventive fitting can be disassembled and reattached because the sealing structures are less damaged during assembly than other metal/metal seals involving pinch points or vise-like clamping arrangements. The re-assembly steps can involve forming a new cut end on the tubing, so as to rely on a different endmost corrugation. Alternatively, the seal can be reused by simple reassembly, and preferably then tested.

The fitting is effective and not unduly expensive. Its components are small and compact, requiring less assembly time and producing a good seal at modest tightening torque.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A fitting for an end of a length of tubing having corrugations ranging between a maximum and a minimum diameter for terminating the tubing at an end section, said fitting comprising:
   a retainer having at least one ridge sized to extend inwardly to a radius between said maximum and minimum diameters for gripping said tubing axially above an endmost corrugation of said tubing and an axially oriented inwardly facing surface to seal against the tubing;
   a body having a threaded surface and a hollow cylindrical part sized to admit said retainer;
   a nut having thread complementary with said threaded surface of said body, said nut having a cap part configured to engage said retainer for urging said retainer axially toward said body with threaded advance of said nut relative to said body; and,
   said body having an annular groove therein, said annular groove bounded inwardly by a tubular stub with an axially oriented outwardly facing sealing surface, and wherein said advance of said nut on said body folds said end section of the corrugated tubing over itself and forms said end section into a seal body by sliding the folded said end section between the retainer and the tubular stub, the seal body comprising a pair of substantially parallel axially disposed sealing surfaces between said axially oriented inwardly facing surface of the retainer and said axially oriented outwardly facing sealing surface of the tubular stub.

2. The fitting of claim 1, wherein said end section is an endmost corrugation.

3. The fitting of claim 1, wherein said tubular stub has an axially facing wall and an outer edge having a diameter greater than said minimum diameter and smaller than the maximum diameter whereby, upon said advance of said nut on said body, an end of said length of tubing is positioned on said axially facing wall.

4. The fitting of claim 3, wherein said outer edge comprises an intersection of said axially facing wall and said outwardly facing sealing surface.

5. The fitting of claim 1, wherein said retainer further comprises a terminal end having an axially oriented inwardly facing surface disposed below said at least one ridge, wherein said advance of nut on said body urges said terminal end past the axially facing wall, with a clearance between the terminal end and the axially facing wall occupied by said end section.

6. The fitting of claim 1, wherein said seal body is substantially in contact with said outwardly facing sealing surface of the tubular stub.

7. The fitting of claim 1, wherein said nut includes a leading edge wherein said end section of said tubing gets caught between said leading edge and said axially facing wall of said tubular stub during said advance of said nut to form said sealing member.

8. The fitting of claim 1, wherein said body further includes a further surface for bearing a complementary means to connect to other hardware.

9. The fitting of claim 1, wherein said retainer is circumferentially split along at least part of a length of the retainer, to enable engagement over said maximum diameter.

10. A method for forming a coupling between a fitting and an end of a length of tubing, comprising:
    providing a length of tubing having corrugations ranging between a maximum diameter and a minimum diameter and including an endmost section and a cut end;
    providing a fitting comprising a retainer with a ridge, the fitting further comprising a body and a nut;
    engaging said tubing in said retainer so that the ridge is disposed axially behind at least an endmost corrugation of said tubing;
    urging said cut end axially against an axially facing wall of said body, said axially facing wall peripherally surrounded by an annular groove around a tubular stub, and having an outer edge, said outer edge having a diameter greater than said minimum diameter;
    advancing said nut on said body, thereby folding said endmost section over itself and over said outer edge to form a pair of substantially parallel axially extending sealing surfaces between said retainer and said tubular stub; and,
    sliding the folded said endmost section between the retainer and the tubular stub by further advancing said nut, whereby the substantially parallel axially disposed sealing surfaces between said axially oriented inwardly facing surface of the retainer and said axially oriented outwardly facing sealing surface of the tubular stub, seal the coupling between the fitting and the tubing.

11. The method of claim 10, wherein said annular groove is formed in said body having an radially extending surfaces, the method further comprising engaging said retainer in said nut having an axially leading edge, and wherein said urging is accomplished by advancing said nut relative to said body until said axially leading edge contacts said radially extending surfaces.

12. The method of claim 10, wherein said annular groove is formed in said body having a first threaded surface, the method further comprising engaging said retainer in said nut having a second threaded surface, and wherein said urging is accomplished by engaging said threaded surfaces of the body and the nut and threading the nut causing said nut and said retainer to advance axially relative to said body.

13. The method of claim 10, wherein said endmost section comprises said endmost corrugation, said retainer comprises a terminal flange with an end surface having an inward edge and an axially oriented inwardly facing surface, and said body comprises a tubular stub having an outer edge and an outwardly facing sealing surface, wherein said urging causes crimping said endmost corrugation between said inward edge and said outer edge of said tubular stub and further urging causes said folding of said endmost section over itself and said pair of substantially parallel axially oriented sealing surfaces are formed between said axially oriented inwardly facing surface of the retainer and said axially oriented outwardly facing sealing surface of the tubular stub.

* * * * *